United States Patent

VanKerkhove et al.

[15] 3,635,545

[45] Jan. 18, 1972

[54] MULTIPLE BEAM GENERATION

[72] Inventors: Alan P. VanKerkhove; Roger E. Baldwin, both of Rochester, N.Y.

[73] Assignee: Eastman Kodak Company, Rochester, N.Y.

[22] Filed: Apr. 14, 1967

[21] Appl. No.: 631,031

[52] U.S. Cl. .......................350/163, 346/108, 340/173 LM, 350/3.5, 350/162, 350/167, 350/169

[51] Int. Cl. .......................G02b 27/10, G02b 27/38

[58] Field of Search .................350/169, 162, 165; 346/108; 340/173

[56] References Cited

UNITED STATES PATENTS

| | | | |
|---|---|---|---|
| 3,364,497 | 1/1968 | MacAdam | 346/108 |
| 3,407,405 | 10/1968 | Hoadley | 340/173 |
| 3,408,656 | 10/1968 | Lamberts | 346/108 |
| 3,427,629 | 2/1969 | Jacobs | 340/173 |

*Primary Examiner*—Terrell W. Fears
*Attorney*—William H. J. Kline, Robert F. Crocker and Morton A. Polster

[57] ABSTRACT

Method and apparatus for generating a plurality of separate and distinct signal beams of mutually coherent radiation. The signal beams, which are of substantially equal intensity, are produced as the result of interference generated by directing a beam of coherent radiation at a radiation-impeding medium having a plurality of regularly spaced and substantially identical zones of variable impedance (e.g., a plurality of very small cylindrical lenses or mirrors). The invention is illustrated as it might be used in apparatus for recording data in the form of a plurality of diffraction gratings of individually unique spatial frequencies effectively superimposed one upon another, the individual gratings being produced as the result of further interference patterns created by the intersection of a reference beam and each of the plurality of signal beams.

2 Claims, 10 Drawing Figures

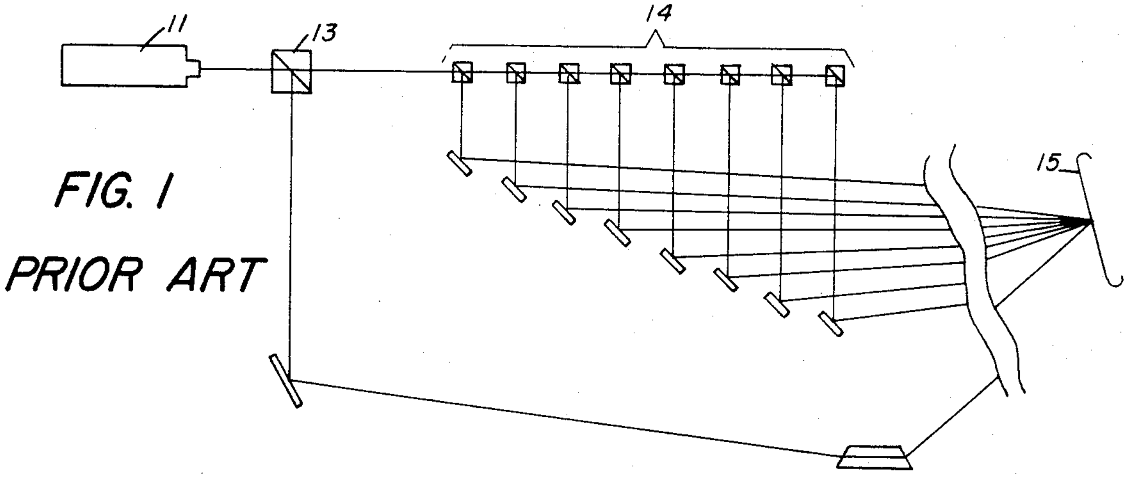
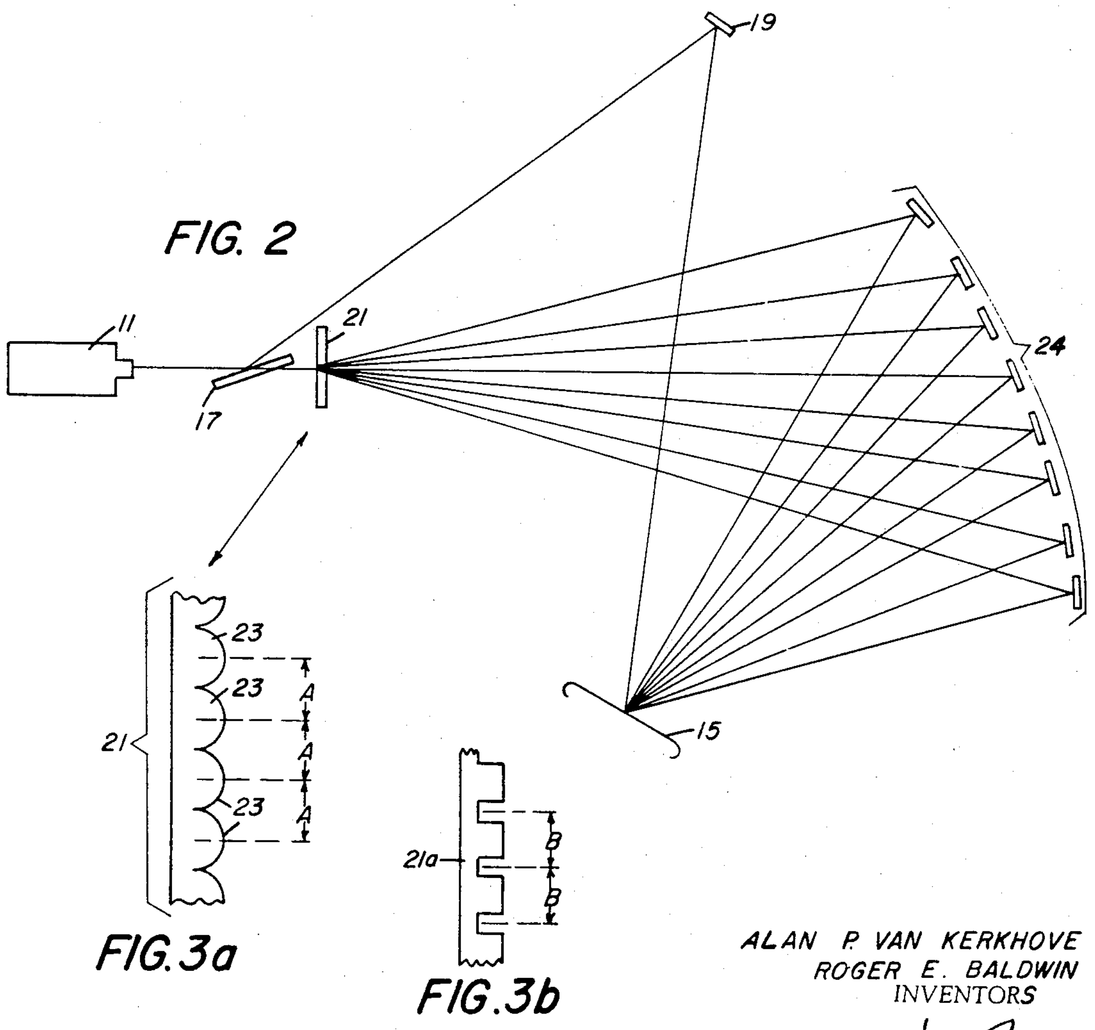
FIG. 2, FIG. 3a, FIG. 3b
ALAN P. VAN KERKHOVE
ROGER E. BALDWIN
INVENTORS
BY Morton A. Polster
ATTORNEY

ALAN P. VAN KERKHOVE
ROGER E. BALDWIN
INVENTORS

BY Morton A. Polster

ATTORNEY

MULTIPLE BEAM GENERATION

BACKGROUND OF THE INVENTION

This invention was developed in relation to information storage and retrieval systems wherein information is recorded on photographic film in the form of a plurality of superimposed diffraction grating patterns. In such systems, a plurality of signal beams of mutually coherent radiation are used to create interference patterns which form individual grating patterns on the recording medium. Although the subject invention is not limited in its applicability to such data-recording systems, it will be described herein in the environment of such recording systems to facilitate understanding of its operation and utility.

Although the recording of binary information on photographic film in the form of light and dark portions indicative of binary bits has been well known for some time, these prior art systems have never been very satisfactory due to the difficulty of maintaining proper alignment of the film in readout apparatus, and also due to the more serious problem of loss of information resulting from dirt, dust and/or imperfections in the film medium itself. Recently, in U.S. Pat. application Ser. No. 306,057, filed Sept. 3, 1963, now U.S. Pat. No. 3,312,955, R. L. Lamberts and G. C. Higgins disclosed a novel information storage and retrieval system which overcomes the dirt and alignment problems which have normally plagued film storage systems. According to the Lamberts and Higgins system, binary information is recorded on film in the form of a composite diffraction grating comprising a plurality of superimposed line patterns of individually unique frequencies, each individual line pattern corresponding to a particular binary bit. When light is directed through the superimposed line patterns, a strong first-order diffraction line appears for each unique line pattern included in the composite grating. For instance, a seven-digit binary numeral may be recorded in the form of 1 to 7 superimposed diffraction gratings, the presence or absence of a particular line grating resulting in the presence or absence of its corresponding first-order diffraction line during readout and being indicative of the "1" or "0" value of its corresponding binary bit. Since each of the individual line patterns appears throughout the entire composite grating area (i.e., since each segment of the superimposed grating area carries the information relating to all seven bits), readout apparatus tolerances are greatly increased, and dirt problems are minimized.

Improvements on the Lamberts and Higgins system have already been made and include methods and apparatus in which the superimposed diffraction gratings are recorded on film by utilizing interference patterns produced at the intersection of a reference beam and a plurality of signal beams of coherent light. The beams are mutually coherent (i.e., of corresponding wavelength and polarization), and they are directed by means such as beam-splitters, prisms and mirrors, along different paths all intersecting in the same recording area. In each of these improvements, the necessary plurality of signal beams is generated by conventional methods, namely, by broadening the source beam so that it will impinge on a plurality of separate individually directed mirrors, or by passing the source beam through a succession of beam-splitters.

The beam-spreading method just referred to above is quite inefficient in that a large portion of the source beam is necessarily wasted between the mirrors, and the conventional beam-splitting method is quite expensive to use, since a separate beam-splitter is required for each desired signal beam and each successive beam-splitter must be specially designed to reflect and pass different proportions of the source beam in order to provide signal beams of relatively equal intensity.

SUMMARY OF THE INVENTION

In the novel method and apparatus disclosed herein, a portion of the source beam is directed at a radiation-impeding medium having a plurality of regularly spaced and substantially identical zones of variable impedance. As used herein, the term "impedance medium" refers to any material which transmits or reflects radiation in such a manner that the phase, velocity, and/or direction of the radiation is altered thereby. In the preferred form of the invention, the impeding medium is comprised of very small cylindrical lenses (as least 25 lenses per millimeter) formed in a radiation-transmitting plastic material.

When the source beam impinges upon the impeding medium, it is effectively separated into a plurality of secondary sources from which the radiation emanates to form new wave fronts. These new wave fronts interfere with each other to form an array of separate and distinct beams which diminish in intensity as their distance from the center of the array increases. However, for purposes of data recording, the intensities of a large number of the central beams are within an order of magnitude and, therefore, may be considered to be substantially equal in terms of practical equipment design.

These relatively bright central beams, which are themselves formed by interference, are used as signal beams, each one being directed to the recording area so that it will interfere with the reference beam to form a separate and distinct line pattern of an individually unique frequency, in the manner well known in the art. Further, in one disclosed embodiment of the invention, two mutually perpendicular variable impedance media are used to create a complex interference pattern which forms a two-dimensional array, thereby making possible the design of equipment in which several lines of information may be recorded simultaneously.

Although presently manufactured for other purposes, lenticular film base has proven satisfactory when used as a variable impedance means in practicing the subject invention. When this fact is viewed in relation to the simplicity of the disclosed structure, the economic advantages of the invention herein become quite apparent.

Therefore, it is an object of this invention to provide a simple, practical and economic method for dividing a source beam of radiation into a plurality of separate and distinct beams of corresponding wavelength and polarization.

It is another object of this invention to replace a plurality of conventional beam-splitting means with a solitary variable impedance means to produce interference patterns forming a plurality of separate and distinct beams of radiation.

It is a further object to form an array of several lines of separate and distinct beams of substantially equal intensity by means of light interference patterns.

Other objects, advantages and characteristic features of the subject invention will be in part obvious from the accompanying drawings, and in part pointed out in the following detailed description of the invention. Reference will be made to the accompanying drawings wherein like reference characters designate corresponding parts, and in which:

FIG. 1 is a simplified schematic diagram of a prior art data recording system using conventional beam-splitting means to obtain the desired data signal beams;

FIG. 2 is a simplified schematic diagram of the preferred radiation-transmitting form of the invention herein incorporated in a data-recording system;

Figure 4:
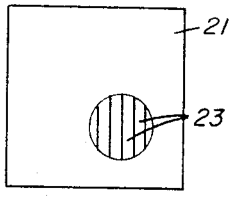
Figure 5:
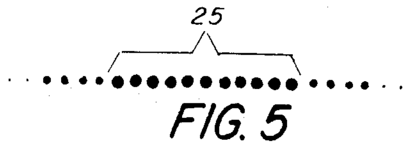
Figure 6:
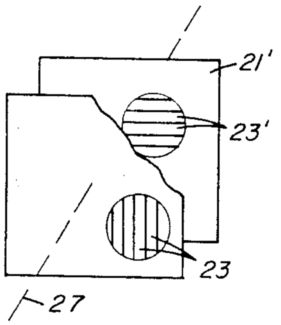
Figure 7:
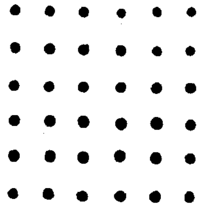
Figures 8, 9:
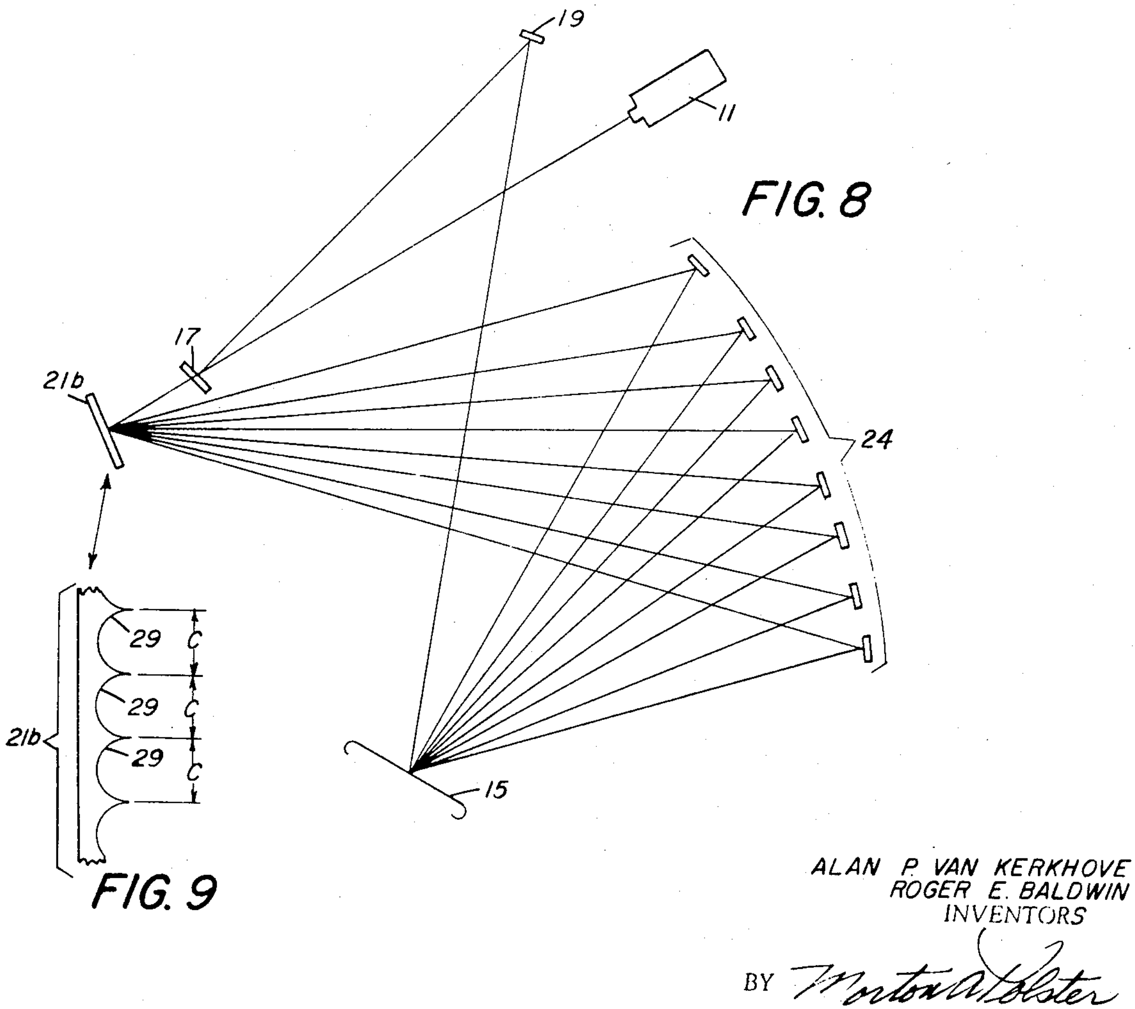

FIG. 3*a* is a greatly magnified cross-sectional view of the preferred form of variable impedance means used to produce the desired data signal beams in the system disclosed in FIG. 2, and FIG. 3*b* is a similar view of another form of such impedance means;

FIG. 4 is a plan view of the variable impedance medium illustrated in FIG. 3, showing a portion of the surface of the medium in a greatly magnified spot;

FIG. 5 shows an array of beams formed by interference when a source of coherent radiation is directed through the variable impedance medium illustrated in FIG. 4;

FIG. 6 illustrates (with simulated spot magnification) two mutually perpendicular variable impedance media aligned on a common axis;

FIG. 7 shows an array of beams formed by interference of the radiation emanating from impedance media oriented as shown in FIG. 6;

FIG. 8 is a simplified schematic diagram of the radiation-reflecting form of the invention herein incorporated in a data-recording system; and FIG. 9 is a greatly magnified cross-sectional view of the variable impedance means used in the system illustrated in FIG. 8.

FIG. 1 illustrates in simplified schematic form a prior art diffraction grating recording system in which conventional beam-splitting means are used to create the necessary data signal beams. In this prior art apparatus, a source beam of coherent radiation generated by laser 11 is directed through reference beam-splitter 13 and data signal beam-splitters 14. The beams thus formed are directed by mirrors and prisms so that they intersect in the predetermined recording area on the surface of film record member 15. Each signal beam interferes with the reference beam to form an individual line pattern of a unique spatial frequency, these respective line patterns being effectively superimposed one upon another in the recording area. Each signal beam is controlled selectively (by means not shown) in accordance with the nature of the information being recorded to cause the presence or absence of the particular individual line patterns corresponding to digital data in the manner referred to above.

Attention is now directed to the relatively expensive and time-consuming practical problems which are encountered in the use of conventional beam-splitting means in the prior art system generally described above. Each beam-splitter 14 requires separate and careful alignment to assure satisfactory interference patterns at the recording area. Further, since it is essential that the densities of the various line patterns recorded on film 15 be substantially equal, it is necessary that the intensities of the various signal beams also be substantially equal. In order to assure such equal intensities, each beam-splitter 14 must be individually designed to pass and reflect varying portions of the source beam. For instance, in a system such as that illustrated in FIG. 1 wherein eight separate and distinct beams are desired, the leftmost beam-splitter 14 would have to be designed so that only one-eighth of the source beam would be reflected from its surface, the remaining seven-eighths passing through to the second beam-splitter which, in turn, would be designed to reflect one-seventh of that portion of the source beam impinging upon it, while passing the remaining six-sevenths of the beam. Similarly, each succeeding beam-splitter would reflect and pass one-sixth–five-sixths; one-fifth–four-fifths; one-fourth–three-fourths; etc. Should an array of 30 or perhaps 900 signal beams be required, the costly complexity of such prior art bean generation must be readily appreciated.

Referring now to FIG. 2, the basic data-recording system disclosed in FIG. 1 is shown modified in accordance with the preferred radiation-transmitting form of the invention herein. A pellicle 17 (a thin gelatin film) is used as a conventional beam-splitter to direct approximately one-half of the source beam onto reference beam mirror 19 from which it is reflected to the recording area and the surface of film record member 15. The remaining portion of the source beam passes through variable impedance medium 21 which breaks up the beam into a plurality of secondary sources. The radiation emanating from these secondary sources creates interfering wave fronts which combine to form a plurality of separate and distinct data signal beams, the latter being reflected from mirrors 24 so that they intersect with the reference beam at the surface of film member 15. In order to keep the optical path lengths of the various beams approximately equal, mirror 19 and mirrors 24 are positioned on the perimeter of a plane ellipse having one focal point at the recording area and the other at the point at which the source beam impinges on pellicle 17.

FIG. 3*a* is a greatly magnified cross-sectional view of the preferred form of variable impedance medium 21. A plurality of cylindrical lenses 23 are positioned in linear parallel relation such that the distances "A" (between the substantially identical zones of variable impedance) are equal.

It should be noted that variable impedance medium 21 can be any light-transmitting material having regularly spaced variations in thickness such as shown in FIG. 3*b*. However, the cylindrical lens form illustrated in FIG. 3*a* is preferable, since the focusing action of the individual lenses concentrates the radiation emanating from each of the secondary sources, thereby increasing the efficiency of the system.

When cylindrical lenses 23 are oriented as shown in the magnified spot of FIG. 4, the interference patterns produced by variable impedance member 21 form a plurality of beams in a line configuration such as that illustrated in FIG. 5 (Note: to simplify the drawing, FIG. 5 shows only about one-third of the beams produced in actual practice). Although the beams appearing at the ends of the line are quite weak, the centrally positioned beams 25 can be used for recording purposes, since in terms of practical design they may be considered to be of substantially equal intensity, i.e., their intensities do not vary by more than one order of magnitude. As noted above, lenticular film base has proven to be quite acceptable as a variable impedance medium. The focusing effect of the small individual lenticles (lenses) serves to increase markedly the number of signal beams whose intensities fall within one order of magnitude, and lenticular film base having 25 lenticles per millimeter has been used to produce a line configuration having as many as 30 usable, substantially equivalent beams.

In a variation of the preferred embodiment illustrated in FIGS. 2 and 3, two variable impedance members, arranged as shown in FIG. 6 are used. According to this variation, the variable impedance media 21 and 21' are aligned along common axis 27 so that cylindrical lenses 23 and 23' are mutually perpendicular (as shown in the greatly magnified spots). When aligned in this manner, the plurality of secondary radiation sources produced by the impedance media form interference patterns which result in the beam array shown in FIG. 7. It should be noted, however, that the weaker intensity beams, which normally appear at the end portions of each line, have been omitted from this drawing, and the particular number of beams shown in the array has been arbitrarily selected merely for purposes of illustration. In actual practice, 30 rows of signal beams, each row including 30 separate and distinct beams of substantially equal intensity have been produced by the arrangement shown in FIG. 6. It can be appreciated that such an array may be directed at 30 separate rows of elliptically positioned mirrors, similar to those shown in FIG. 2, and in this manner 30 lines of superimposed diffraction gratings might be recorded simultaneously.

Referring now to FIG. 8, the basic data-recording system disclosed in FIG. 2 is shown modified in accordance with the radiation-reflecting form of the invention herein. Again, approximately one-half of the source beam from laser 11 is reflected from pellicle 17 to reference beam mirror 19 from which it is directed to the recording area. The remaining portion of the source beam is reflected from the surface of variable impedance medium **21*b*** which breaks up the beam into a plurality of secondary sources from which new interfering wave fronts emanate to create the desired signal beams.

As can be seen in greatly magnified cross section in FIG. 9, variable impedance medium **21*b* comprises a plurality of very small mirrors 29 positioned in linear adjacent relation. The distances "C" between successive mirrors 29 are equal, and their respective curvatures are substantially identical. The preferred form for radiation-transmitting impedance medium 21*b*** is a plurality of very small, mirrored, cylindrical surfaces positioned in adjacent linear parallel relation.

The advantages of the disclosed system should be obvious; instead of the expense in time and materials required for designing and building a plurality of separate beam-splitting units, the invention herein provides a single, simple and inexpensive variable impedance medium. Instead of a plurality of adjustments in setting up the apparatus, only the solitary impedance unit need be adjusted.

It should be understood that the specific embodiments of the present invention described hereinabove have been selected to facilitate the disclosure of the invention rather than to limit the particular form which the invention may assume. For instance, although the invention has been described in relation to diffraction grating recording systems, the novel beam generation method disclosed herein can be used wherever a plurality of separate and distinct beams of mutually coherent radiation may be required. Further, various modifications may be made to the specific forms shown in order to meet the requirements of practice without departing from the spirit or scope of the invention.

We claim:

1. In a diffraction grating recording apparatus of the type wherein a source of coherent radiation is divided into a reference beam and a plurality of signal beams of corresponding wavelength and polarization, said beams being directed along different respective paths intersecting with one another in a predetermined recording area so that the interference of said signal beams and the reference beam will produce at said area a plurality of superposed line patterns of individually unique spatial frequencies, the improvement wherein the means for dividing said source radiation into said plurality of signal beams comprises:

a lenticular film base including lens means having a plurality of very small cylindrical lenses arranged in linear adjacent parallel relation to intercept a portion of said source beam for separating said portion into a plurality of secondary sources from which said radiation emanates to form an interference pattern comprising a plurality of separate and distinct beams of substantially equal intensity.

2. The apparatus according to claim 1 wherein said lens means includes two mutually perpendicular sets of said adjacent parallel cylindrical lenses aligned along a common axis.

* * * * *